US012765586B2

(12) United States Patent
Abou Nehmi Filho et al.

(10) Patent No.: US 12,765,586 B2
(45) Date of Patent: Oct. 20, 2026

(54) PROCESS FOR PRODUCTION OF CONCENTRATES OF CHELATED MINERALS WITH SOYBEAN AMINO ACIDS AND/OR SOYBEAN PROTEIN, AND RELATED PRODUCT

(71) Applicant: Yessinergy Holding S.A., Sao Paulo (BR)

(72) Inventors: Victor Abou Nehmi Filho, Sao Paulo (BR); Juliana Bueno da Silva, Santa Barbara d'Oeste (BR); Edson Martins de Abreu, Sao Jose dos Campos (BR)

(73) Assignee: Yessinergy Holding S/A, Sao Paulo (BR)

( * ) Notice: Subject to any disclaimer, the term of this patent is extended or adjusted under 35 U.S.C. 154(b) by 545 days.

(21) Appl. No.: 18/014,868

(22) PCT Filed: Jul. 8, 2021

(86) PCT No.: PCT/BR2021/050295
§ 371 (c)(1),
(2) Date: Jan. 6, 2023

(87) PCT Pub. No.: WO2022/006649
PCT Pub. Date: Jan. 13, 2022

(65) Prior Publication Data

US 2023/0345990 A1 Nov. 2, 2023

(30) Foreign Application Priority Data

Jul. 8, 2021 (BR) ...................... 10 2020 013917-7

(51) Int. Cl.
*A23L 33/165* (2016.01)
*A23J 3/16* (2006.01)
(Continued)

(52) U.S. Cl.
CPC ............... *A23L 33/165* (2016.08); *A23J 3/16* (2013.01); *A23J 3/346* (2013.01); *A23K 20/142* (2016.05);
(Continued)

(58) Field of Classification Search
CPC ... A23L 33/165; A23L 33/175; A23K 20/142; A23K 20/24; A23K 20/30; A23J 3/16; A23J 3/346
(Continued)

(56) References Cited

U.S. PATENT DOCUMENTS

| | | | |
|---|---|---|---|
| 4,830,716 | A | 5/1989 | Ashmead |
| 2003/0069172 | A1 | 4/2003 | Ericson et al. |

(Continued)

FOREIGN PATENT DOCUMENTS

| | | |
|---|---|---|
| BR | 102012008876 A2 | 11/2013 |
| BR | 102015029707 | 3/2016 |

(Continued)

OTHER PUBLICATIONS

Filho (1): Published as BR102015029710A2 on May 30, 2017 (Year: 2017).*

(Continued)

*Primary Examiner* — Brent T O'Hern
(74) *Attorney, Agent, or Firm* — Michael J Porco; Gerald E Hespos

(57) ABSTRACT

A process is provided for obtaining concentrates of minerals chelated with amino acids or small peptides comprising soybean aminogram. The reaction mixture is formed by diluting the source of natural amino acids from soybean which can undergo addition of synthetic amino acids from soybean with water, at a ratio ranging from 1:4-7 in mass of amino acids per volume of water, with the physical reaction medium being transformed in emulsion through micro shear
(Continued)

using a rotation from 2,500 to 5,000 rpm, and the stoichiometric balance being an excess of metal ions in relation to the ligand ions of soybean amino acids, in a molar ratio varying between 1:1.2-1.8 between divalent metal ions and amino acids ions, respectively. High concentrates of minerals chelated with amino acids from soybean aminogram are obtained and have application as food supplements or in animal nutrition feed.

6 Claims, 3 Drawing Sheets

(51) Int. Cl.

| | |
|---|---|
| ***A23J 3/34*** | (2006.01) |
| ***A23K 20/142*** | (2016.01) |
| ***A23K 20/20*** | (2016.01) |
| ***A23K 20/24*** | (2016.01) |
| ***A23L 33/175*** | (2016.01) |

(52) U.S. Cl.
CPC .............. *A23K 20/24* (2016.05); *A23K 20/30* (2016.05); *A23L 33/175* (2016.08)

(58) Field of Classification Search
USPC ............................................................ 426/46
See application file for complete search history.

(56) References Cited

U.S. PATENT DOCUMENTS

| | | | |
|---|---|---|---|
| 2013/0224794 | A1 | 8/2013 | Jiang et al. |
| 2021/0254056 | A1 | 8/2021 | Liu et al. |

FOREIGN PATENT DOCUMENTS

| | | | | |
|---|---|---|---|---|
| BR | 102015029710 | | | 5/2017 |
| BR | 102015029707 | B1 | * | 3/2018 |
| CN | 101747222 | | | 6/2010 |
| CN | 105541650 | | | 5/2016 |
| CN | 105724784 | | | 7/2016 |
| CN | 106260592 | | | 1/2017 |
| CN | 106418550 | | | 2/2017 |
| CN | 107156856 | | | 9/2017 |
| CN | 108077609 | | | 5/2018 |
| CN | 108185143 | | | 6/2018 |
| CN | 110720640 | A | | 1/2020 |
| CN | 111066963 | A | | 4/2020 |
| CN | 111073931 | A | | 4/2020 |
| CN | 111096395 | A | | 5/2020 |
| JP | 602153 | | | 1/1985 |
| JP | 0678715 | | | 3/1994 |

OTHER PUBLICATIONS

Filho (2): published as BR 102015029707A8 on Sep. 19, 2017 (Year: 2017).*

Nassar: Published as WO 1987/002867A1 on May 21, 1987 (Year: 1987).*

Infinity Pharma. Minerais quelatos (bisglicinato): mineral de alta absorc;ao. Publicado em: Nov. 28, 2018. Available at: Accessed on: Aug. 18, 2021.

Internation Search Report for PCT Application No. PCT/BR2021/050295, Dated Sep. 2, 2021, six (6) pages.

Lisboa, V; Bueno, J.; Ronchi, c.; Roppa, L .; Nehlmi, V Zinco multi-amino quelatado melhora a conversao alimentar defrangos. NutriNews, published on Apr. 28, 2021 Available at: . Accessed on : Aug. 25, 2021.

Literatura Via Farma. Ferro Quelato 20%. Published on May 31, 2017. Avaliable at: . Accessed on : Aug. 18, 2021.

English translation of BR102015029710A2.

* cited by examiner

PROCESS FOR PRODUCTION OF CONCENTRATES OF CHELATED MINERALS WITH SOYBEAN AMINO ACIDS AND/OR SOYBEAN PROTEIN, AND RELATED PRODUCT

FIELD OF INVENTION

The present invention relates to minerals chelated with amino acids from soybean aminogram, having concentrations higher than those existing today, which have industrial application such as food supplements or animal nutrition feed.

BACKGROUND OF THE INVENTION

For decades humans and animals have been supplemented with minerals in inorganic forms, the most common in form of oxides, sulfates and carbonates. However, these forms of supplementation are becoming less and less efficient to meet modern requirements, while the environmental impacts caused by them are increasingly serious. The low bio-availability of inorganic sources of minerals is largely responsible for this situation.

In animal and human nutrition, not all mineral deficiencies can be corrected with supplements in their inorganic forms. For example, severe deficiencies of Iron and Calcium in humans require intravenous applications of these minerals associated with organic molecules. And even so, the results are not fully satisfactory because, among one application and another, there are significant variations in their serum concentrations in the body. Besides, these applications are costly and time-consuming. In animal nutrition, the increase in genetic potential of farm animals can no longer be fully achieved using only mineral supplements in their inorganic forms, since there are bio-availability limits of these sources which cannot be exceeded.

It was for this reason that, in recent decades, a wide variety of minerals began to be associated with organic molecules in order to increase more and more their bio-availability. However, even so, the high nutritional requirements of humans and farm animals cannot be fully met by the available minerals. Even more concentrated and bio-available products are needed.

The definition of chelated minerals originates from coordination compounds and inorganic salts, respectively, in the chemical nomenclature. Chelated minerals originates from the metal ion that was chemically/physically extracted from mineral rocks, in combination with amino acids, which would be its organic part, through coordinated bonds. The inorganic minerals would be the inorganic salts, and the metal ion and the anion, both inorganic species, have the same origin because they are extracted from mineral rocks and are combined by ionic bonds.

The term chelated refers to a coordination compound, or complex, which depends on the electronic characteristics of the metal ion and the ligand. According to the acid base theory of Lewis, the metal ion would be the Lewis acid that receives a pair or pairs of electrons, and the ligand would be the Lewis base that donates a pair or pairs of electrons. In the atomic structure of ligands there are more electronegative ions than others, so these are called donor atoms usually being Oxygen and Nitrogen, among other non-metallic elements.

If the binding of the mineral is with amino acids, peptides or proteins, which have a chemical structure with two or more electronic active sites, the mineral is called chelate. Chelates are considered the most bio-available form of minerals for nutritional supplementation.

There are two forms of absorption of minerals in the intestines. Minerals bound to amino acids or peptides, with electrical charges, are directly metabolized by intestinal endothelial cells, being later released into the bloodstream. This is a slow process with limited absorption capacity. The electrically neutral chelates, formed between minerals and n-peptide molecules (with n from 2 to 11, wherein n=2 means a dipeptide, n=3 means a tripeptide, n=4 means a tetrapeptide, n=5 means a pentapeptide, and so on) having an organic part with up to 800 Daltons of molecular weight, are inserted in the protein absorption processes, that is, they use the amino acids to which they are bound as transporting proteins directly into the bloodstream. Peptides are absorbed by specialized amino acid absorption sites in the intestinal endothelium and fall directly into the bloodstream. It is a faster process and with much wider limits of absorption capacity than that of inorganic minerals.

According to the commercial segment, when a chelated mineral is bound to only one kind of amino acid it is called mono-amino acid. Otherwise it is called multi-amino acid. Generally, multi-amino acids come from protein hydrolysis in smaller peptides, although they can also be produced from a mixture of synthetic amino acids. The multi-amino acids chelated minerals are even more hydrophilic when compared to inorganic minerals and chelated minerals having only one type of amino acid (mono-amino acid). This feature causes these chelated minerals to be absorbed similarly to smaller peptides.

Therefore, keeping the stability of a chelated mineral due the attack of acids and enzymes in the digestive system is important, as the chelated mineral needs to arrive intact to the intestinal lumen. That is, the greater the amount of mineral together with the greater diversity of amino acids that reach the intestinal lumen, in chelated form, the more bio-available the mineral will be.

The coordination compounds of transition metals [Chrome (Cr), Manganese (Mn), Iron (Fe), Cobalt (Co), Copper (Cu) and Zinc (Zn)] and alkaline earth metals [Calcium (Ca) and Magnesium (Mg)] can be formed from chemical reactions involving one or more organic ligands, for example, amino acids with transition metal salts or alkaline earth metals, in an aqueous solution with controlled pH, temperature and pressure. A chelated complex or coordination polymer can be obtained. The definitions of chelating coordination compound and coordination polymer are as per the attributions of JONES, C. J., "A química dos elementos dos blocos d e f", Porto Alegre: Bookman, 2002, 184 p., and JANIAK, C., "Engineering coordination polymers towards applications", Dalton Trans., v. 35, n. 6, p. 2781-2804, 2003, respectively. Chelating coordination compounds occur when atoms donors of bidentate ligands, which make coordinated bonds to the same metal atom, make claw-shaped bonds (JONES, C. J., "A química dos elementos dos blocos d e f", Porto Alegre: Bookman, 2002, 184 p.). Coordination polymers are compounds that extend "infinitely" in one, two or three dimensions via metal-ligand bridged bonds having a "more or less" covalent character. This means that the coordinated bridged bond is weaker than the chelate coordinated bond. These polymers are also known as metal-organic coordination networks, or metal-organic structures, having more or less covalent bonds between metal and ligand and also with other interactions (such as hydrogen bonds, electrostatic bonds, van der Waals bonds, $\pi$-$\pi$ stackings bonds).

Through these concepts there are the coordination numbers of these formed complexes that can vary from 2 to 8, both in solid state and in solution. This means that the metal ion can accommodate ligands according to the size of its coordination environment, which would be the packing between the metal ions coordinated to the ligand. In case of coordination compounds, some solvent (usually water) molecules coordinate the structure of the complex formed.

As minerals that are bound to two or more amino acids are better absorbed by the intestines, the manufacturers of organic mineral seek to produce compounds where the proportion of minerals coordinated with amino acid molecules is maximum, thus leaving a very small proportion of the mineral in ionic or insoluble form.

The stoichiometric ratio that allows to obtain the highest rates of organic metal-ligand coordination, also known as degree of chelation (DQ), is 1 mole of divalent mineral per 2-2.4 moles of amino acids, or 1 mole of trivalent mineral per 3-3.6 moles of amino acids. This is due to the fact that in coordination compounds, where chelated minerals are included, it is necessary to determine a constant of stability involving the structures of the complexes in formation, in equilibrium in the solvent, with controlled thermodynamic conditions. Therefore, the stoichiometric reaction of metal ions with the ligand, for formation of chelate or/and coordination polymer, involves formation of several complex species that will be added together, providing a kind of final product formed. Thus, the product, which is the concentration of the chelate formed through the metal ion-ligand coordinated bond, is divided by the concentrations of the metal ion reactants, multiplied by the concentration of the binding reagent. The reaction occurs in an aqueous environment, with controlled pH and temperatures, giving rise to the global constant of stability, which would be the sum of the constants of stability of all intermediates formed by the chelated complex.

Generally, amino acid ligands have two or more coordination sites, through their donor atoms, and they may be called bidentate and tridentate ligands, but they may also have electronic bridging properties. This depends on the conditions of temperature, pressure, solvent and catalyst that will determine the product that will be formed.

The preference of various species of amino acids varies from mineral to mineral. The bonds of minerals to their respective preferred species of amino acid tend to be stronger and longer lasting than other species. Likewise, the strength of bonds between a mineral and two or three different species of amino acid tends to be greater than with a single kind of amino acid.

The strength of the bond between minerals and amino acids is known as global constant of stability (Ks). The metal-amino acid complexes having a high coefficient of stability are those that remain more stable during the digestive process, along the gastrointestinal tract, and are those that have a higher proportion of intact structures that reach the intestinal lumen, to be absorbed, such as proteins, directly into the bloodstream. Therefore, the constant of stability has a high correlation with bio-availability. The constant of stability can infer some concepts when comparing one type of chelated mineral against another. Chelated minerals have a greater constant of stability than proteinates. And chelated minerals having more species of amino acids have higher values of constant of stability than chelated minerals having just one kind of amino acid. This statement takes into account the three-dimensional structure of the complex, having a more stable electronic structural configuration between the metal-amino acid and/or metal-peptide bonds, from a thermodynamic point of view, than among other molecular interactions.

Because they are bonded to organic molecules having a molecular weight higher than theirs, the chelated minerals end up having a relatively low concentration of mineral, when compared to the mineral in inorganic form. This is a problem from the point of view of nutrition, as supplementation with chelated minerals ends up taking up a lot of space in diets, when the opposite would be desirable. For example, in human nutrition, mineral supplementation is usually done using capsules and pills. If the mineral has a low concentration, the size and/or number of capsules and pills to be taken daily increases a lot, making its ingestion difficult. In case of animal nutrition, the space in the feed occupied by minerals having low concentration could be better used with other equally necessary nutrients, if the chelated minerals were more concentrated.

In addition to the high concentration, a high bio-availability would be another way to reduce the amounts of minerals to be supplemented. Bio-availability also depends on the degree of chelation, that is, the amount of metal ions bound to organic molecules and the stability of these bonds. In other words, increasing the concentration of minerals by decreasing the degree of chelation would not be a solution. On the other hand, multi-amino acid chelates have greater biodigestibility, as they have a greater constant of stability. However, this is achieved at the cost of using several different amino acids, whose mean molecular weight ends up being higher than that of smaller amino acids such as glycine.

From an environmental point of view, the low bio-availability of inorganic forms of supplementation can be seen in the increasing concentration of minerals in feces of farm animals, which end up polluting the groundwater throughout the Planet. Thus, the use of chelated minerals having high concentration, high degree of chelation and high bio-availability allows for a lower consumption of minerals per kilogram of live weight produced. A smaller amount of mineral residues in feces also contributes to less pressure on the environment.

EXISTING PATENTS

The document JPS 602153 discloses how to obtain soybean protein hydrolyzate using alkaline earth metals such as calcium. The document JPH 0678715 discloses the preparation of a soybean milk protein composition enriched with alkaline earth metals.

Minerals chelated with specific amino acids are already known, as disclosed for example in document CN 108185143, wherein zinc is chelated with methionine, and in documents CN 108077609 and CN 101747222, wherein zinc is chelated with glycine.

Persons skilled in the art also know processes for preparation of minerals chelated with soybean protein or amino acids, as disclosed in documents CN 107156856, CN 106418550, CN 106260592, and in other documents such as US20130224794, CN 105541650 and CN 105724784.

BRIEF DESCRIPTION OF THE SEVERAL VIEWS OF THE DRAWINGS

The following figures are attached to consolidate this specification.

OBJECTIVES OF THE INVENTION

Figure 1:
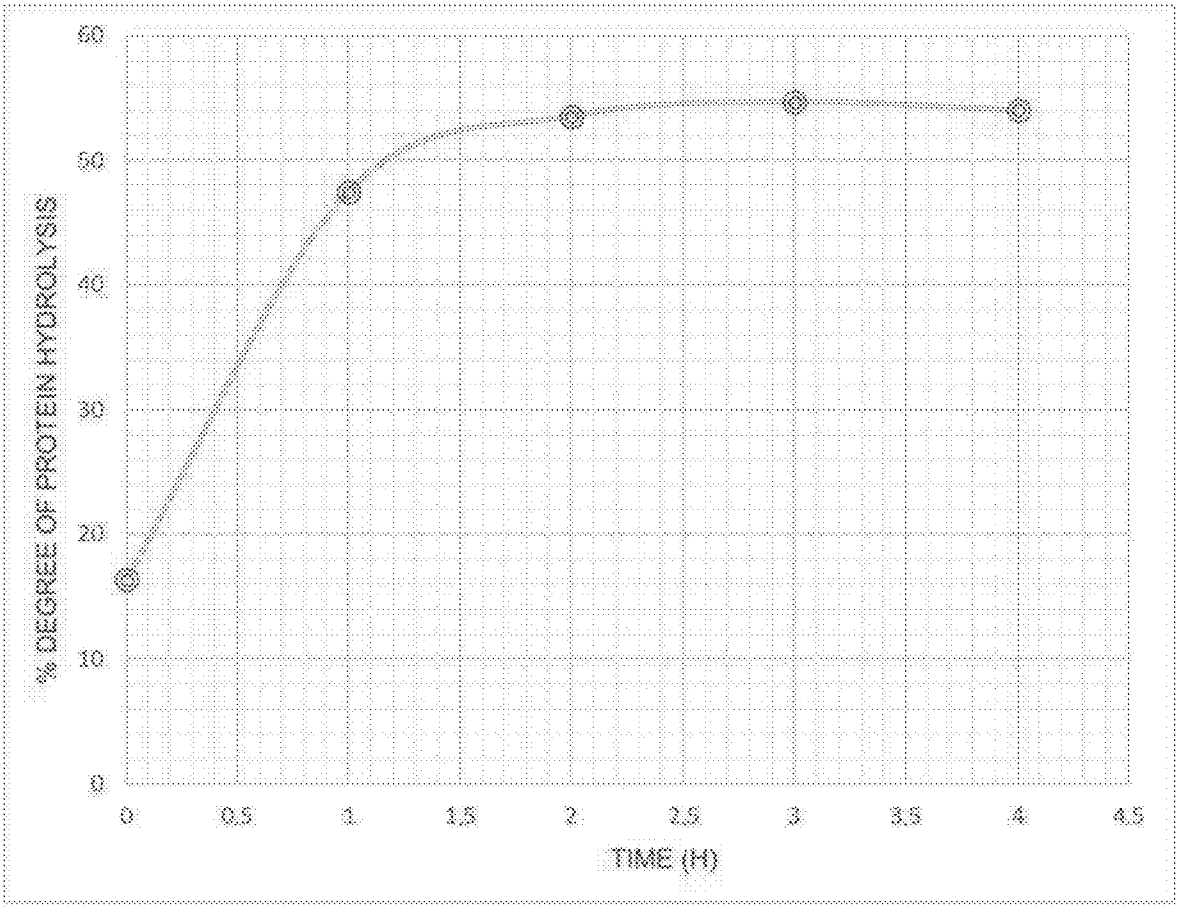
FIG. 1 shows the degree of protein hydrolysis followed throughout the process of hydrolysis using endoprotease.

The present invention aimed to develop chelated minerals concentrates presenting the following advantages and solving the following problems, in order to:

- Achieve high concentrations of minerals;
- Achieve a high degree of coordination or chelation;
- Present a high solubility;
- Present a high bio-availability, demonstrated by a high global constant of stability (Ks), between amino acid bonds and metal ions;
- Present a higher concentration of minerals, releasing space in feed formulations and nutritional supplementation for other types of necessary components;
- Present a higher absorption rate, so that the excreta of those who consume the concentrates contain less mineral concentration, in order to decrease pollution of rivers and groundwater;
- Present low production cost to allow the dissemination of its use.

SUMMARY OF THE INVENTION

Chelated minerals having modified crystallographic structure were developed, in order to allow unprecedentedly high concentrations of minerals, without reducing chelation rates. The base of amino acids used in chelation maintained the proportion of soybean aminogram. And the change in crystallographic structure could be proven by changes in the constant of stability (Ks), when compared to minerals currently chelated with soybean.

This was achieved through a process to obtain a concentrate of minerals chelated with amino acids or small peptides comprising aminogram of soybean, wherein the reaction mixture is formed by diluting the source of natural soybean amino acids that can undergo additivation of soybean synthetic amino acids with water, in a ratio ranging from 1:4-7 in mass of amino acids per volume of water, with the physical means of reaction being transformed into emulsion through micro shear using a rotation of 2,500-5,000 rpm, wherein the stoichiometric balance is an excess of metal ions in relation to the ligand ions of soybean amino acids, in a molar ratio between divalent metal ions and amino acid ions varying between 1:1.2-1.8 respectively.

DETAILED DESCRIPTION OF THE INVENTION

A better understanding of how the crystallographic structures of the coordinated bonds between amino acids and metal ions changed as the concentrations of reagents varied, identifying the important role played by amino acids that act as preferential coordinators or ligands of each type of metal ion, allowed to modify the classic stoichiometric balance of 1 mole of divalent metal ions to 2-2.4 moles of amino acids, that is, from an excess in moles of amino acid ligand to an excess in moles of metal ions. Thus, it was possible to work with proportions closer to 1 mole of metal ions to 1.2-1.8 moles of amino acids, without significantly decreasing the degree of coordination between metals and ligands. This allowed to obtain chelates with higher concentrations of minerals and maintain, even so, chelation degrees as high as those in the prior art.

In the process for obtain the concentrates, according to the invention, it was observed that under emulsion conditions, with high dilution, lower rotation of the stirrers and excess of metallic ligands in relation to amino acid ligands, the crystallographic structures of the bonds between amino acids and metal ions were changed, as well as the roles played by preferential ligands were changed. These changes could be observed in significant changes of constant of stability (Ks) of the chelated minerals thus formed, as well as in maintaining high coordination rates.

According to the invention, soybean is used as the basic source of amino acids because, in addition to the low cost, its aminogram is considered close to ideal for the nutrition of humans and animals. In other words, the proportion between the 19 amino acids that make up soybean is very close to the nutritional needs of warm-blooded animals, including humans. The distribution of specific absorption sites for each amino acid in the intestines is very similar to the soybean aminogram, thus maximizing the possibilities for absorption.

Therefore, the chelated minerals from the present invention have unique features that are fundamental to the greater bio-availability claimed in this invention:

HIGH MINERAL CONCENTRATIONS: the products contain large amounts of minerals, never before reported in multi-amino acid complexes and even in mono-amino acid complexes, with exception of glycinates. The mean concentrations of minerals from the invention are compared to those from the prior art in Table 1A below.

TABLE 1A

| | minerals | |
|---|---|---|
| donor minerals | prior art | present invention |
| calcium | 16 | 22 |
| cobalt | 10 | 15 |
| copper | 16 | 22 |
| iron | 16 | 22 |
| magnesium | 10 | 14 |
| manganese | 16 | 22 |
| zinc | 16 | 22 |

HIGH DEGREE OF COORDINATION: the degrees of coordination or chelation of all the chelated minerals from this invention proved to be as high as or even superior than those in the prior art. By way of example, the mean degrees of chelation of the chelates from this invention are compared to those from the prior art in Table 1B below.

TABLE 1B

| | degree of chelation | |
|---|---|---|
| donor minerals | prior art | present invention |
| calcium | 88 | 86 |
| cobalt | 96 | 91 |
| copper | 94 | 93 |
| iron | 91 | 87 |
| magnesium | 88 | 86 |
| manganese | 91 | 94 |
| zinc | 92 | 93 |

HIGH SOLUBILITY: minerals bonded to multiple amino acids have high solubility and therefore low probability of interacting with other substances in the digestive system.

HIGH GLOBAL CONSTANT OF STABILITY: although presenting significant changes in relation to the constants of stability of the current state of the art (stoichiometric ratio 1 mole of mineral:2 moles of amino acids), the mean constants of stability of each of the chelated minerals from this invention remained high or even greater, with examples of values being shown in Table 2. This is an indicative of their high bio-availability.

TABLE 2

| donor minerals | global Ks prior art | global Ks present invention |
|---|---|---|
| calcium | 10.7 | 10.9 |
| cobalt | 11.3 | 11.6 |
| copper | 6.1 | 12.0 |
| iron | 5.3 | 10.4 |
| magnesium | 11.5 | 11.4 |
| manganese | 10.7 | 10.7 |
| zinc | 13.7 | 11.9 |

LOW PRODUCTION COST: the use of soybean amino acids and high concentration contribute to reduce production costs and makes the prices of the chelated minerals from this invention more competitive, stimulating their use.

Table 3 below provides the contents of mineral concentrates chelated using soybean proteins and/or amino acids for minerals concentration (in percentage by mass) and the possible degrees of coordination or chelation (in percentage by mass), within the scope of this invention:

TABLE 3

| donor minerals | minerals concentration (%) | chelation degree (%) |
|---|---|---|
| calcium | 20% to 26% | 82% minimum |
| cobalt | 14% to 21% | 92% minimum |
| copper | 20% to 24% | 92% minimum |
| iron | 20% to 23% | 90% minimum |
| magnesium | 13% to 17% | 83% minimum |
| manganese | 19% to 22% | 91% minimum |
| zinc | 20% to 24% | 91% minimum |

The minerals from this invention were chelated with amino acids and small peptides derived from hydrolyzed soybean protein, whose raw material can be bran and/or concentrate and/or soybean protein isolate, containing between 42 to 70% of proteins. The use of a set of 19 amino acids from the soybean aminogram, under ideal conditions of physical state (emulsion), dissolution, stirring, temperature and pH for the preferred ligands, for each type of metal ion, was the key to achieve higher concentrations of minerals and a high degree of coordination of the final products.

A preferred embodiment of the invention employs all the amino acids existent in soybean as ligands, regardless of the ratio between them: aspartic acid (Asp), asparagine (Asn), glutamic acid (Glu), glutamine (Gln), serine (Ser), glycine (Gly), histidine (His), threonine (Thr), alanine (Ala), proline (Pro), tyrosine (Tyr), valine (Val), methionine (Met), cysteine (Cys), isoleucine (Ile), leucine (Leu), phenylalanine (Phe), lysine (Lys) and tryptophan (Trp), and the raw material that originates these amino acids can be used in form of soybean meal, protein extract or even isolated or concentrated soybean protein.

Process for Obtaining Chelated Minerals

The process for obtaining chelated minerals, according to this invention, is based on improved conditions of chemical reaction of the set of amino acids presented in the soybean aminogram used, preferably as soybean bran or its hydrolyzate, or protein extract, or still isolated soybean protein and a metallic salt of divalent or even trivalent metals. Metals can be chosen from the group of transition metals, such as: cobalt, copper, iron, manganese, zinc and chromium; or even alkaline earth metals such as calcium and magnesium. The salts of these metals can be in form of sulfates, acetates, nitrates, bicarbonates, benzoates, chlorides or oxides.

Therefore, the chelation reactions according to the present invention must occur by excess of mineral, in an aqueous solution based on hydrolyzed soybean bran.

The reaction occurs with a stoichiometric molar ratio of approximately 1 mole of metal ions to 1.2 to 1.8 moles of amino acids. This makes it possible to obtain chelateds having higher concentrations of minerals, with degrees of coordination greater than 90%, in case of zinc, iron, cobalt, copper and manganese, and greater than 80% in case of earth minerals such as calcium and magnesium.

The raw material containing the soybean amino acids can be presented as soybean bran or its extract or protein isolate, but for the purpose of mass or molar balance, the soybean aminogram comprising the following molar fractions of each amino acid should be considered: 0.07 Asp+0.05 Asn+0.12 Glu+0.05 Gln+0.07 Ser+0.08 Gly+0.02 His+0.06 Thr+0.07 Ala+0.06 Pro+0.03 Tyr+0.06 Val+0.01 Met+0.01 Cys+0.05 Ile+0.08 Leu+0.04 Phe+0.06 Lys+0.01 Trp. It is emphasized that these molar fractions are obtained from the aminogram of soybean bran, or its protein extract or soybean protein isolate containing at least 42% of crude protein. The estimated mean molar mass is 92.288 g/mole by elemental analysis of C, H, N and S.

For the purposes of this invention, the soybean aminogram is considered the presence, in the chelated mineral, of the 19 amino acids existing in soybean, regardless of the existing proportion between them. In other words, it is part of the scope of this invention the possibility of adding synthetic amino acids, mainly the preferred ligands, to the soybean aminogram, in order to obtain the chelated minerals from the invention.

The chemical reaction between the amino acids and metals occurs in a dilute aqueous medium, preferably basic, using a dilute aqueous solution of an alkalizing agent which can be a base chosen from alkali or alkaline earth metal hydroxides and/or basic oxides. According to an embodiment of the invention sodium hydroxide is used in a molar concentration from 0.001 to 0.20 mole/l.

For the preparation of protein and availability of amino acids and peptides, first is prepared a suspension of soybean bran, protein concentrate or protein isolate in water, wherein the protein source is received, diluted in water at 40° C., in a proportion that can vary from 1 kg of soybean bran to 4 liters of water up to 1 kg of soybean bran to 7 liters of water. Then the reaction mixture of soybean meal is microparticulated by rotation between 2,500 and 5,000 rpm, in a high-speed industrial equipment of type, for a period that can vary from 15 minutes to hours, in order to change its physical state from aqueous solution to emulsion. After complete homogenization of the suspension, an enzymatic pool is used for protein hydrolysis and availability of amino acids and peptides for the chelation reaction with metal ions. To do so, first the amylase and cellulase enzymes are measured, which react for about 2 to 4 hours at a temperature of 40 to 60° C. and pH=4.5 to 6.5, and there is notably a decrease in viscosity of the suspension, facilitating the action of proteases (endoprotease and exoprotease). Protein hydrolysis occurs by addition of proteases, shortly after the end of the action of amylase and cellulase, which react under optimal conditions for a minimum period of 2 to 5 hours at a temperature between 4° and 65° C. and pH=7.8 to 9.4. Then, the reaction mixture is kept at a temperature between 5° and 70° C. for another 2 to 4 hours, until the reaction stabilization is observed by analysis of degree of hydrolysis (OPA), as shown in the attached FIG. 1.

Although not mandatory, after the hydrolysis step, the protein base may go through a protein precipitation and impurity removal step, by centrifugation or drainage of the supernatant material, further increasing the concentration of amino acids and soluble peptides available for the chelation reaction. This allows for an even greater increase in the concentration of minerals and/or the degree of chelation reached in the final product.

Then, with the amino acid base kept under slow stirring between 120 and 250 rpm, temperature maintained between 4° and 60° C., and pH maintained at levels above 7.0, the salt containing the mineral to be chelated is added to the reaction mixture directly in its solid state or solubilized in water using an unconventional stoichiometric molar ratio (the conventional ratio is 1 mole of divalent metal ions to 2-2.4 moles of amino acids, or even 1 mole of trivalent ions to 3-3.6 moles of amino acids), which can be 1.0:1.2-1.8 in moles of divalent metal ions to moles of amino acids, respectively. And so this must remain for at least 1 hour, before being dried in a spray drier equipped or not with a fluid-bed.

Mineral raw materials are not usually standardized products, since part of them is the result of mineral extraction, whose mineral concentration and impurity content can vary significantly among the various mine veins. Likewise, the aminogram of soybean protein sources can also vary significantly depending on soil type, soybean variety and weather conditions. Thus, the ideal physicochemical conditions provided in the invention, such as excess metal ligands in relation to amino acid ligands, high dilution of reaction mixture, emulsion state and slow stirring, allow to obtain chelates with a high concentration of minerals in a given range of stoichiometric ratios of excess minerals, which can range from 50 to 100% excess minerals in relation to protein ligands. This means a molar ratio or stoichiometric proportion varying within the range of 1.0:1.2-1.8 in moles of divalent metal ions to moles of amino acids, respectively.

According to a preferred embodiment of the invention, the process for obtaining a chelated mineral concentrate involves the following steps:

(a) First, there is raw material in a reactor containing amino acids or peptides from soybean aminogram, in form of soybean bran and/or concentrate and/or protein isolate and/or extract, diluted in water, in a proportion varying from 1:4-7 per kilogram of soybean amino acid source to liters of water, respectively, with temperature between 3° and 50° C. under stirring until complete homogenization;

(b) The reaction mixture is microparticulated in high speed rotation (2,500-5,000 rpm) in an ultraturrax micro-shear equipment, for a period ranging from 15 minutes to hours, to form an emulsion;

(c) Then the transition metal salt or alkaline earth salt is added in a molar ratio that can vary from 1.0:1.2-1.8 of divalent metal ions and amino acids, respectively, with the reaction occurring in an alkaline medium by addition of base or alkalizing agent preferably in a molar concentration from 0.001 to 0.20 mole/l of NaOH;

(d) The amylase and cellulase enzymes are first dosed to the reaction mixture, which react for 2 to 4 hours at a temperature of 40 to 60° C. and pH=4.5 to 6.5;

(e) Then proteases (one exoprotease and one endoprotease) are added, which react at pH=7.8 to 9.4 at a temperature between 5° and 70° C. for another 2 to 4 hours, until observation of stabilization of reaction by analysis of degree of hydrolysis (OPA);

(f) The product obtained goes to drying.

According to another embodiment of the invention, the process for obtaining a concentrate of chelated minerals with soybean amino acids comprises the following steps:

(a) First, a suspension of soybean is prepared, which can be in form of bran, protein extract, or concentrate, or protein isolate, in water, at 30° C. to 50° C., in a proportion that can vary from 1 kg of soybean bran to 4 liters of water up to 1 kg of soybean bran to 7 liters of water;

(b) The reaction mixture is microparticulated in an ultraturrax micro-shear equipment using rotation from 2,500 to 5,000 rpm for a period ranging from 15 minutes to hours;

(c) After complete homogenization of the suspension, amylase and cellulase enzymes are dosed, which react for 2 to 4 hours at a temperature of 40 to 60° C. and pH=4.5 to 6.5;

(d) Protein hydrolysis occurs by addition of proteases, which react for a minimum period of 2 to 5 hours at pH=7.8 to 9.4 at a temperature between 4° and 60° C.;

(e) The reaction mixture is then kept at a temperature between 5° and 70° C. for a further 2 to 4 hours, until stabilization of the reaction is observed;

(f) With the amino acid base being kept under slow stirring ranging from 120 to 250 rpm, temperature being kept between 4° and 60° C., and pH being maintained at levels above 7.0, the salt containing the mineral to be chelated is added to the reaction mixture directly in its solid state or solubilized in water, using a molar or stoichiometric ratio of 1.0:1.2-1.8 in moles of divalent metal ions to moles of amino acids, respectively; and so this must remain for at least 1 hour, before being dried in a spray drier equipped or not with a fluid-bed.

The following examples merely serve to better elucidate the invention, and should not be used for purposes that limit its scope.

Example 1

Example of Process

Tests were carried out obeying the chemical reaction of generic equation indicated below between amino acids and peptides from soybean aminogram (raw material of soybean bran), indicated by "L" (ligands), and salts in form of metal sulfates "M" in slightly basic aqueous medium (using a diluted aqueous solution of 0.010 mole/L of NaOH):

$$MSO_4 \cdot xH_2O\ (aq) + L_n(H_2O)p\ (aq) + 2NaOH\ (aq) \rightarrow ML_n(H_2O)_{2p}\ (aq) + Na_2SO_4\ (aq) + H_2O_2\ (l) + xH_2O\ (l)$$

Wherein M=Ca, Co, Cu, Fe, Mg, Mn and Zn, and L=ligand, which will be the sum of molar fractions of amino acids, which must be unitary, so:

$$L=(0.07Asp+0.05Asn+0.12Glu+0.05Gln+0.07Ser+0.08Gly+0.02His+0.06Thr+0.07Ala+0.06Pro+$$

0.03Tyr+0.06Val+0.01Met+0.01Cys+0.05Ile+0.08Leu+0.04Phe+0.06Lys+0.01Trp)

Emphasizing that these molar fractions are obtained from the aminogram of soybean bran, protein extract or protein isolate containing at least 50% of crude protein. The estimated mean molar mass was 92.288 g/mole by elemental analysis of C, H, N and S, wherein aq=aqueous, l=liquid, and:

x ranges from 1 to 7;

n=2 and/or 3; and p=1 and/or 2.

For preparation of protein and availability of amino acids and peptides, first the suspension of the soybean bran, protein extract or protein isolate in water was prepared, in which the protein source was received, diluted in water at 40° C. and microparticulated in high-speed industrial equipment, being stored in industrial reactors. In case of soybean bran having 46% of crude protein, a mixture of 239.1 g of soybean bran with 1.3 liters of water was used. The stirring and shear using high rotation (3,500 rpm) in an ultraturrax equipment lasted 2 hours.

After complete homogenization of the suspension, an enzymatic pool was used for hydrolysis of proteins and availability of amino acids and peptides for the chelation reaction with metal ions. To do so, first the amylase and cellulase enzymes were dosed, which reacted for about 3 hours at a temperature of 50° C. and pH=5.5, and notably there was a decrease in viscosity of the suspension, facilitating the action of proteases (endoprotease and exoprotease). Protein hydrolysis occurred by addition of proteases, shortly after end of the action of amylase and cellulase, which reacted under optimal conditions for a minimum period of 3 hours at pH=8.2 at 60° C. And so the reaction mixture was held for 3 hours until observation of stabilization of reaction by analysis of hydrolysis degree (OPA), as shown in FIG. 1, which represents the degree of protein hydrolysis followed throughout the process of hydrolysis using endoprotease.

The use of enzymes is known to persons skilled in the art and followed the guidance indicated by the respective manufacturers.

The attached FIG. 1 shows the degree of protein hydrolysis followed throughout the process of hydrolysis using endoprotease.

Once the stability of protein hydrolysis is verified, the addition of 430.1 g of zinc sulphate salt occurred, representing an approximate molar ratio or molar stoichiometric ratio of 1.0:1.6 in zinc ion to ion amino acids. The reaction mixture was then kept at a controlled temperature of 50° C., pH controlled at 8.0, and stirring at 160 rpm, for one hour. Then the mixture was spray dried.

The analysis of degree of coordination or chelation was made by the FTIR method. Thus, FIG. 2 shows the infrared vibrational spectra from product soybean bran with zinc (Zn-bran) and from two precursors of said product, pure soybean bran and zinc sulfate.

Figure 3:
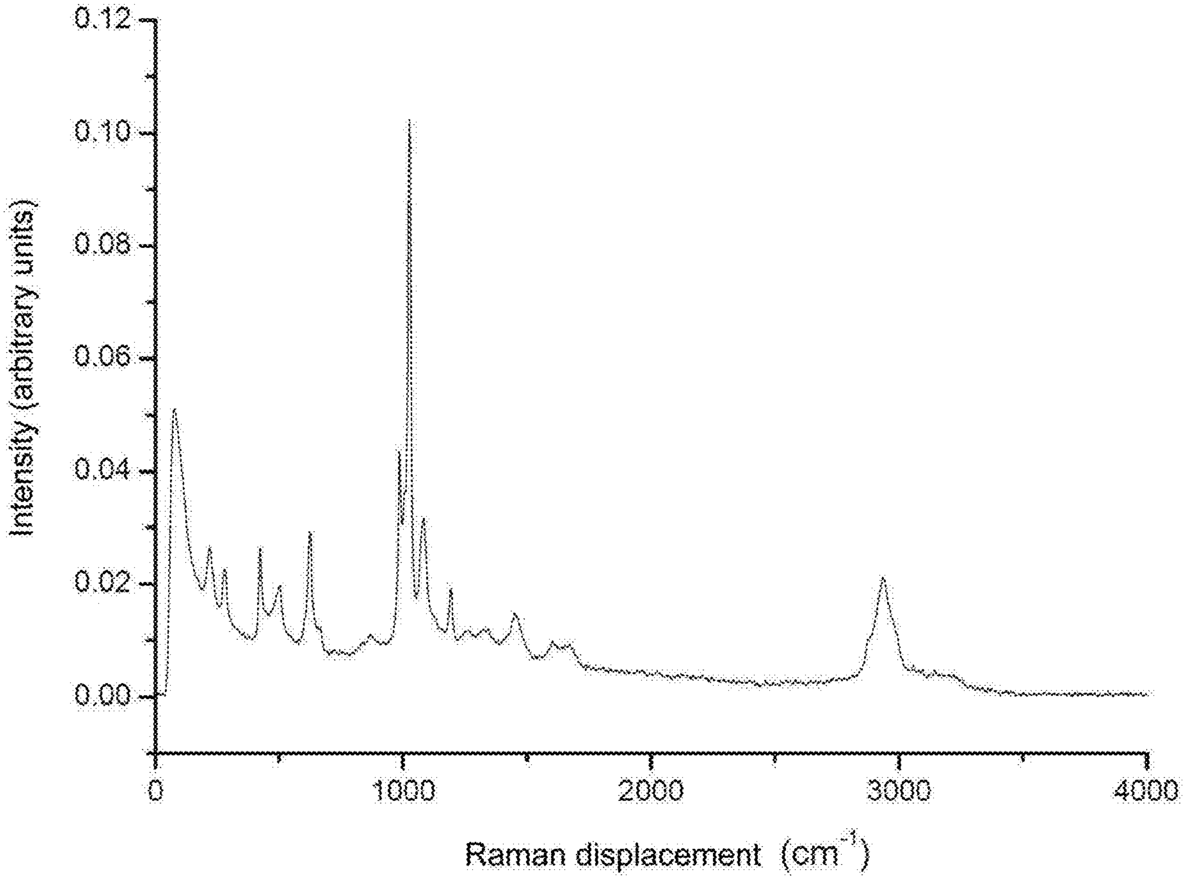
FIG. 3 shows the Raman spectrum of Zn-bran product.

Comparing the IR spectra of pure soybean bran and Zn-bran, it should be noted that the bands in the region from 3,000 $cm^{-1}$ to 2,837 $cm^{-1}$ decrease in intensity with incorporation of zinc ion. These bands are related to the freedom of the nitrogen atom that no longer participate in bonds with hydrogen atoms. The decrease in intensity of these bands indicates formation of complex between amino acids and metal, in this case zinc. In FIG. 3, the Zn-bran of soybean was analyzed by Raman spectrometry to corroborate the FTIR results, wherein a low intensity band at 855 $cm^{-1}$, referring to the C—C stretch and symmetric angular deformation in the plane of COO bonds relating to most amino acids, was observed. The value 1091 $cm^{-1}$ is attributed to the deformation of C—H bond in the imidazole group of histidine, and the value 626 $cm^{-1}$ is attributed to the C—S stretch of cysteine. These attributions, referring to the cysteine and histidine amino acids in the Raman spectrum of Zn-bran of soybean, demonstrate that zinc interacts closer to these amino acids, placing them as preferential ligands.

Figure 2:
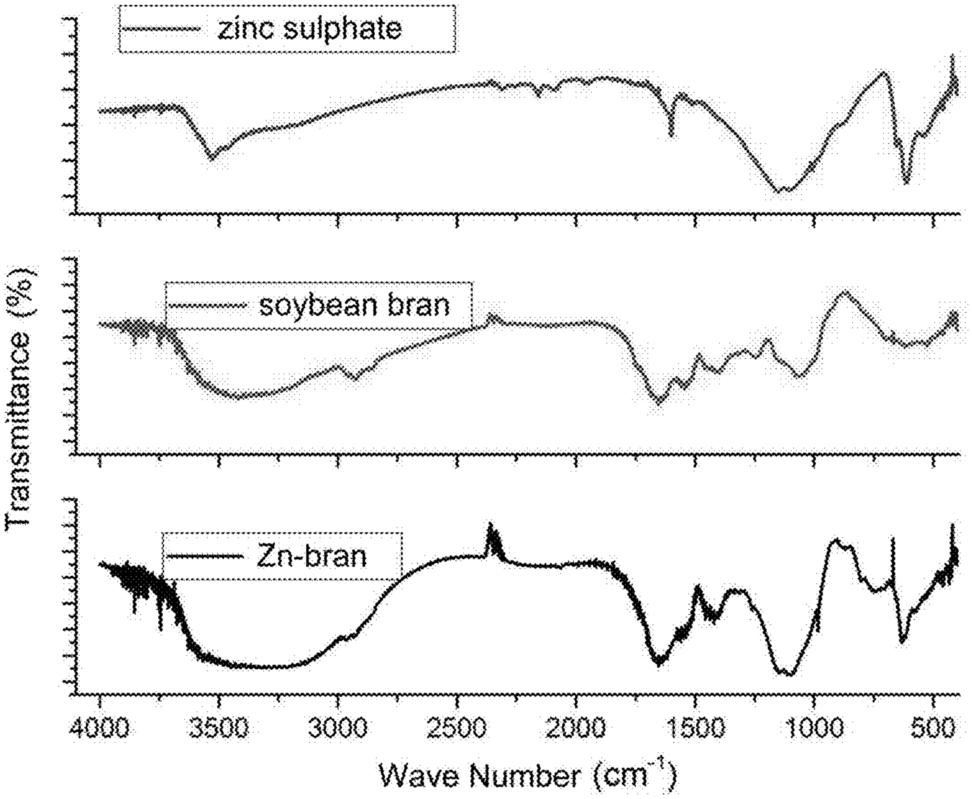
FIG. 2 shows infrared spectra of product Zn-bran and its precursors Zinc Sulfate and Soybean Bran.

The attached FIG. 2 shows the infrared spectra of product Zn-bran and its precursors Zinc Sulphate and Soybean Bran, and FIG. 3 shows the Raman spectrum of product Zn-bran.

Following the procedures shown above, for chelation of Zinc with soybean bran proteins, according to the physicochemical conditions provided in the invention, with high dilution, transformation of the reaction mixture to state of emulsion, stoichiometric ratio with excess mineral in relation to amino acids, and low stirring speed, many other chelation reactions could be done using different minerals and their different sources, as shown in table 4 below. Table 4 shows masses of metal salts and soybean bran having 46% of crude protein ($SO_4$—sulphate; $CH_3CO_2$—acetate; $NO_3$—nitrate; $C_7H_5O_2$—benzoate; $HCO_3$—bicarbonate; and Cl—chloride).

TABLE 4

| | masses (g) | | | | | | |
|---|---|---|---|---|---|---|---|
| | $SO_4$ | $CH_3CO_2$ | $NO_3$ | $C_7H_5O_2$ | $HCO_3$ | Cl | bran |
| Ca | 340.2 | 247.8 | 255.2 | 402.8 | 252.7 | 188.8 | 239.1 |
| Co | 387.3 | 294.9 | 302.3 | 450.0 | 299.9 | 236.0 | 239.1 |
| Cu | 398.9 | 306.5 | 313.9 | 461.5 | 311.4 | 247.5 | 239.1 |
| Fe | 379.6 | 287.2 | 294.6 | 442.3 | 292.2 | 228.3 | 239.1 |
| Mg | 300.8 | 208.3 | 215.8 | 363.4 | 213.3 | 149.4 | 239.1 |
| Mn | 377.4 | 284.9 | 292.4 | 440.0 | 289.9 | 226.0 | 239.1 |
| Zn | 403.5 | 311.1 | 318.5 | 466.2 | 316.1 | 252.2 | 239.1 |

Table 5 below shows a summary of results obtained in terms of concentration of chelated minerals prepared with various sources of soybean proteins, according to this invention. Table 5 shows that the highest concentrations of minerals were achieved when a concentrated soybean protein extract having 70% of crude protein was used as a source of amino acids. On the other hand, the lowest mineral concentrations were obtained when soybean bran having 46% of crude protein was used. The greater amount of non-chelatable organic residues from soybean bran explains these differences. However, for reasons of production costs, it may be that minerals chelated with soybean bran proteins having 46% of crude protein will be economically more competitive than those made with concentrated soybean protein extract, having 70% of crude protein. However, both are within the scope of this invention.

Table 5 also shows the mean concentrations of various chelated minerals from the prior art, when prepared with soybean proteins, compared to results obtained in this example of use of the process of concentration of chelated minerals from this invention.

TABLE 5

| donor mineral | prior art soybean bran (46% of crude protein) | present invention minimum soybean bran (46% of crude protein) | present invention average soybean proteins (60% of crude protein) | present invention maximum soybean proteins (70% of crude protein) |
|---|---|---|---|---|
| calcium | 16.0 | 20.8 | 22.9 | 24.3 |
| cobalt | 16.0 | 13.9 | 16.2 | 17.8 |
| copper | 16.0 | 20.7 | 22.5 | 23.4 |
| iron | 16.0 | 21.1 | 22.4 | 23.2 |
| magnesium | 10.0 | 13.7 | 15.0 | 16.4 |
| manganese | 16.0 | 19.9 | 20.7 | 21.5 |
| zinc | 16.0 | 20.8 | 22.1 | 23.3 |

Table 6 below shows a summary of results obtained in terms of degrees of coordination or chelation of chelated minerals produced using various sources of soybean proteins, according to this invention. The table shows that the lowest degrees of coordination occurred when a concentrated soybean protein extract having 70% of crude protein was used as source of amino acids. The greatest degrees of coordination were observed when soybean bran having 46% of crude protein was used. This occurred because stoichiometric ratios presenting more excess of metal ion donors were used in experiments with concentrated soybean protein extract having 70% of crude protein, in order to obtain higher mineral concentrations. The upward or downward variation in the degrees of coordination partially compensated for the lower or higher concentrations of minerals.

TABLE 6

| donor mineral | prior art soybean bran (46% of crude protein) | present invention minimum soybean bran (46% of crude protein) | present invention average soybean proteins (60% of crude protein) | present invention maximum soybean proteins (70% of crude protein) |
|---|---|---|---|---|
| calcium | 88.0 | 84.0 | 83.3 | 82.2 |
| cobalt | 96.0 | 97.0 | 95.4 | 93.1 |
| copper | 94.0 | 93.1 | 92.9 | 92.1 |
| iron | 91.0 | 94.3 | 93.7 | 92.8 |
| magnesium | 88.0 | 87.0 | 85.9 | 84.5 |
| manganese | 91.0 | 95.6 | 94.1 | 92.3 |
| zinc | 92.0 | 95.1 | 94.2 | 92.5 |

According to several chelation tests performed according to the process from this invention, using different sources of soybean proteins and minerals, it was possible to establish the intervals that represent the mineral concentration of each chelated mineral from this invention, as shown in Table 7 below:

TABLE 7

| chelated mineral | present invention minimum | present invention maximum | prior art (*) minimum | prior art (*) maximum |
|---|---|---|---|---|
| calcium | 20% | 26% | 15.5% | 18.0% |
| cobalt | 14% | 21% | 9.5% | 12.5% |
| copper | 20% | 24% | 15.0% | 18.0% |
| iron | 20% | 23% | 14.0% | 17.5% |
| magnesium | 13% | 17% | 7.5% | 11.5% |
| manganese | 19% | 22% | 14.0% | 18.0% |
| zinc | 20% | 24% | 15.0% | 19.0% |

(*) chelated minerals prepared using proteins with soybean aminogram

Example 2

Product

The chelated minerals from the inventive process described above can and should be characterized by at least 3 of the 4 features listed below, which can be measured in laboratories.

1—Concentration of Minerals

The high mineral concentration of chelated minerals is the most important aspect of this invention. With a higher mineral concentration, the chelated minerals from this invention are intended to occupy less space in nutritional supplementation, with a smaller amount and size of capsules and tablets for human consumption and a lower rate of inclusion in animal feed, freeing space for other nutrients. The measurement of mineral concentration of chelate is done by atomic absorption spectroscopy, wherein the amount of metal ions desired is measured, regardless of whether they are in ionic state, bonded to organic or inorganic radicals, or coordinated with peptides or other organic molecules.

1.1—Degree of Coordination or Chelation

It would be useless to increase the concentration of minerals and simultaneously reduce their degree of coordination or chelation. This would represent an increase in proportion of minerals in inorganic state, whose bio-availability is lower. Therefore, to be valuable, the invention of the process for increasing mineral concentration in chelated minerals would need to show that such a result was obtained with a still high rate of coordination of metal ions with protein ligands, so that the multiplication of new mineral concentrations by their respective degrees of chelation would result in a significantly higher concentration of coordinated minerals. For example, if the prior art chelated zinc contains 16% of mineral concentration and 95% of chelation, this means that it contains 16%×95%=15.2% of organic zinc. The chelated zinc from this invention contains, on average, 22% of mineral concentration and 93% of chelation, that is, contains 20.5% of organic zinc, an this is significantly superior in relation to the state of art.

In a complexation reaction, after the stoichiometric planning of the reagents, it is necessary to determine if really all the metal ions were coordinated to the ligand, be it amino acid or eventually another organic compound present in reaction mixture. Through instrumental methods of atomic absorption spectroscopy and the classical complexometric back titration with aminopolycarboxylic acids, the concentration of total metal ions and uncoordinated metal ions is quantified. Thus, the degree of coordination can be considered as the amount of coordinated metal ions divided by total metal ions. The determined value is expressed as a percentage.

This means that in the reaction the salts of divalent metals (Calcium, Cobalt, Copper, Iron, Manganese, Magnesium and Zinc) are chelated through the ligand (sum of the molar fractions of all nineteen soybean amino acids). The interaction of the ligand with each species of metal ion has its particularity, that is, more hydrophilic residues (amino acids) in a peptide sequence interact more strongly with the metal ion in chelate form. Another information is that the high values of degree of coordination reach the molecular formulas in the chemical equations, corroborating the metal content (in percentage) of the supplement from Yessinergy do Brasil.

Table 8 below shows the minimum degrees of coordination or chelation of the minerals from this invention. Table 8 shows that the Calcium, Cobalt and Iron chelates from this invention had their minimum chelation degrees close to the minimum values from the prior art. They are minerals in which glycine and glutamic acid play the role of preferred ligand. This means that possibly if the soybean aminogram had a higher concentration of these amino acids, the minimum degrees of coordination would be higher. This also means that if glycine is added to the reaction mixture, a greater degree of coordination in these products will be obtained.

TABLE 8

| chelated | prior art (*) | | present |
|---|---|---|---|
| mineral | minimum | maximum | invention |
| calcium | 80% | 88% | 82% |
| cobalt | 90% | 96% | 92% |
| copper | 91% | 94% | 92% |
| iron | 81% | 91% | 90% |
| magnesium | 82% | 88% | 83% |
| manganese | 87% | 92% | 91% |
| zinc | 87% | 95% | 91% |

(*) chelated minerals prepared using proteins with soybean aminogram

2—Global Constant of Stability (Ks)

The global constant of stability has a high positive correlation with bio-availability of chelated minerals. Thus, it would not be reasonable to increase its mineral concentration at expense of biodigestibility, that is, with a significant reduction in the global constant of stability.

Furthermore, the global constant of stability is an expression of the crystallographic architecture of the bonds between the mineral and the amino acid ligands. In this invention the normal physicochemical conditions of chelation reaction were changed, having more dilution, transformation of reaction mixture in emulsion, slower stirring and excess metal ions regarding amino acid ligands, so it would be natural if there were changes in global constants of stability and, therefore, in the crystallographic architecture of the final product.

In this invention, the results of the constants of stability of soybean bran/proteins ions were determined according to the data analyzed by FTIR, Raman spectroscopy and UV-Vis.

The global constants of stability of minerals were determined by potentiometric titration method, based on aqueous solution of supplements of Calcium, Cobalt, Copper, Iron, Magnesium, Manganese and Zinc, chelated by amino acids (peptides or protein fragments) of hydrolyzed soybean bran and/or protein concentrate, keeping their stoichiometry. The values of constants of stability are compared to amino acid complexes of a single species and their order of magnitude is greater or equal (KISS, T., SÓVÁGÓ, I., GERGELY, A., "Critical survey of stability constants of complexes of glycine", Pure & Appl. Chem., v. 63, n. 4, p. 597-638, 1991; BERTHON, G., "Stability constants of metal complexes of amino acids with polar side chains", Pure & Appl. Chem., v. 67, n. 7, p. 1117-1240, 1995; YAMAUCHI, O., ODANI, A., "Stability constants of metal complexes of amino acids with charged side chains-part I: positively charged side chains", Pure & Appl. Chem., v. 68, n. 2, p. 469-496, 1996). The order of magnitude of the global constants of stability of chelates from this invention ranged from 105 to 1,013. The higher the value of the constants of stability, the more the divalent metals (Ca, Co, Cu, Fe, Mg, Mn and Zn) chelated (coordinated) by amino acids in peptide form will be bioavailable. In the chelated minerals from this invention these global constant of stability values are higher because the ligand contains all 19 amino acids. This provides greater functional versatility, as well as greater energy stabilization and greater hydrophilicity (they are more hydrophilic) when compared to a divalent metal chelated with just one kind of amino acid.

Table 9 shows the global constants of stability (Ks) of various chelated minerals from this invention, compared to chelated minerals from the prior art, prepared with soybean proteins.

Table 9 shows that the global constants of chelated minerals from this invention remained relatively high, that is, they maintained a high bio-availability.

TABLE 9

| | prior art (*) | | | | | present invention | | | | |
|---|---|---|---|---|---|---|---|---|---|---|
| donor minerals | global Ks | ion M:L | log beta (±0.05) | beta (±0.05) | % ratio | global Ks | ion M:L | log beta (±0.05) | beta (±0.05) | % ratio |
| calcium | 10.7 | 1:2 | 5.22E+10 | 10.7 | 77% | 10.9 | 1:2 | 8.86E+10 | 10.9 | 58% |
| | | 1:3 | 1.60E+10 | 10.2 | 23% | | 1:3 | 6.53E+10 | !0.8 | 42% |
| cobalt | 11.3 | 1:1 | 1.02E+11 | 11.0 | 33% | 11.6 | 1:1 | 4.41E+11 | 11.6 | 69% |
| | | 1:2 | 2.09E+11 | 11.3 | 67% | | 1:2 | 1.98E+11 | 11.3 | 31% |
| copper | 6.1 | 1:2 | 3.26E+05 | 5.5 | 20% | 12.0 | 1:2 | 9.63E+11 | 12.0 | 98% |
| | | 1:3 | 1.27E+06 | 6.1 | 80% | | 1:3 | 1.72E+10 | 10.2 | 2% |
| iron | 5.3 | 1:2 | 1.85E+05 | 5.3 | 100% | 10.4 | 1:2 | 2.81E+10 | 10.4 | 84% |
| | | 1:3 | 1.56E+02 | 2.2 | 0% | | 1:3 | 5.43E+09 | 9.7 | 16% |
| magnesium | 11.5 | 1:2 | 2.44E+10 | 10.4 | 7% | 11.4 | 1:2 | 2.55E+11 | 11.4 | 73% |
| | | 1:3 | 3.02E+11 | 11.5 | 93% | | 1:3 | 9.34E+10 | 11.0 | 27% |
| manganese | 10.7 | 1:2 | 5.14E+10 | | | 10.7 | 1:2 | 5.24E+10 | 10.7 | 54% |
| | | 1:3 | 4.46E+04 | 4.6 | 0% | | 1:3 | 4.48E+10 | 10.7 | 46% |
| zinc | 13.7 | 1:1 | 6.26E+11 | 11.8 | 1% | 11.9 | 1:1 | 3.14E+11 | 11.5 | 42% |
| | | 1:2 | 4.87E+13 | 13.7 | 99% | | 1:2 | 4.33E+11 | 11.9 | 58% |

(*) chelated minerals prepared using proteins with soybean aminogram

The conclusion on the constants of stability of chelated mineral supplements, when the current invention is compared to the state of art, demonstrates that there were changes in the crystallographic structures of the chelated minerals from this invention. However, this occurred without reducing the greater bio-availability of the metal-ligand complex, which remained high.

3—Soybean Aminogram

For the purposes of this invention, the soybean aminogram is considered as the presence, in the chelated mineral, of at least 19 amino acids existing in soybean, regardless of the proportion among them. In other words, it is part of the scope of this invention the possibility of adding synthetic amino acids, mainly the preferred ligands, to the soybean aminogram, to obtain the chelated minerals from this invention.

There is more than one production process condition for each type of metal, which can lead to the production of concentrated chelated minerals having the specifications listed in tables 1, 2 and 3. Each process condition means a specific combination of enzymes, temperatures, pH and stoichiometric ratios used.

However, to date there are no commercial products, patents or bibliographic references about minerals chelated with amino acids from soybean that have concentrations as high as those from this invention, reason why this patent application is for a product and a process.

Product Usage Example-1

An experiment was developed with the purpose of investigating the effect of providing six different sources of Zn, at two levels of supplementation, in diets based on corn, soybean bran and phytase, with respect to performance and balance of Zn in broilers.

The experimental feeds used for the initial phase (1 to 21 days) and for growth (21 to 42 days) were formulated based on corn, soybean bran and phytase.

Feed and water were freely provided throughout an experimental period from 1 to 42 days. The shed room temperature was maintained using 250 Watt infrared lamps and curtains on the sides of the shed. Light was provided for 22 hours/day in a scheme of 12 hours of natural light and 10 hours of artificial light.

2,400 lineage Cobb 500 male chicks were used, distributed in a randomized block design housed on the floor in a shed divided into 120 boxes of 1.0×2.0 meters (3.3×6.6 ft), with reused wood shavings bed, for the purpose of increasing the health challenge of birds.

The birds were randomly distributed in a 6×2 factorial arrangement with six different sources of Zn and two levels of Zn (40 and 80 mg/kg), totaling 12 treatments with 10 repetitions and 20 animals per box (this being considered one experimental unit). Experimental treatments are shown in Table 10.

TABLE 10

| Diet 40 mg Zn/kg | Diet 80 mg Zn/kg |
|---|---|
| T1-Zinc Sulfate-Control | T7-Zinc Sulphate-Control |
| T2-Avalia Zn (methionate 10% Zn) | T8-Avalia Zn |
| T3-B-Traxim (glycinate 26% Zn) | T9-B-Traxim |
| T4-Bioplex (proteinate 16% Zn) | T10-Bioplex |
| T5-YES Zn 16% (soybean 16% Zn) | T11-YES Zn 16% |
| T6-YES Zn 22% (soybean 22% Zn, the chelate from this invention) | T12-YES Zn 22% (the chelate from this invention) |

Summary: 12 treatments (6×2), 10 repetitions, total 120 boxes, 20 birds/box, total 2,400 birds.

The parameters of performance evaluated were feed intake (FI, kg/bird), weight gain (WG, kg/bird), feed conversion (FC, kg/kg).

At 33 days of age, excreta were collected for 24 hours by placing a plastic canvas on the floor of each box to determine Zn content (mg/kg of dry matter in excreta), retained Zn (consumed mg minus excreted mg), and Zn balance (retained Zn/consumed Zn×100).

At 42 days of age, during individual weighing of the birds, the quality of the foot pad was determined, using the Foot Pad Lesions (FPL) score, wherein both foot pads of all animals in the experiment were evaluated. Score 0 was given for cushions without any injuries, 1 for discolored cushions but without deep injuries, and score 2 for cushions with deep injuries (ulcers, blisters, etc.). As this is a subjective fact, only one person was responsible for the assessment of the foot pad score. The Injury Score for each experimental unit was calculated according to the following equation, with FPL index varying from 0 to 200 (all birds having score 2).

$$FPL = \frac{(N^\circ \text{ of animals } 0 \times 0) + (N^\circ \text{ of animals } 1 \times 0.5) + (N^\circ \text{ of animals } 2 \times 2) \times 100}{N^\circ \text{ of animals evaluated}}$$

Foot pad lesions are perhaps the greatest external symptom of zinc absorption deficiency presented by chicks. It is also a source of loss, as the injured paws have no commercial value. Table 11 below shows that even in supplementation with 40 ppm of Zinc (40 mg of Zinc/kg of feed), the chelated Zinc from this invention, represented by YES Zinc G3 having 22% of Zn (YES 22), presented a significantly superior response to all other sources of zinc, including YES 16, which represents the state of art for chelates on soybean proteins. Table 11 refers to "Foot pad lesions % (42 days)", wherein: SF=$ZnSO_4$ (35% Zn); Met=Zn Methionate (Avalia 10% Zn); Gly=Zn Glycinate (B-Traxim 26% Zn); Prot=Proteined Zn (Bioplex 16% Zn); YES 16=YES Zn G2 (16% Zn); and YES 22=YES Zn G3 (22% Zn).

TABLE 11

| level of zinc | source of zinc | | | | | |
|---|---|---|---|---|---|---|
| | prior art | | | | | present invention |
| (mg/kg) | SF | Met | Gly | Prot | YES 16 | YES 22 |
| 40 | 18.98 | 21.06 | 18.42 | 17.96 | 18.23 | 14.68 |
| 80 | 25.09 | 14.00 | 14.23 | 17.03 | 15.53 | 12.63 |
| mean | 22.0 | 17.5 | 16.3 | 17.5 | 16.9 | 13.7 |

Tables 12 and 13 below show that although there were no significant differences in feed intake among batches of chicks supplemented with each of the zinc sources, the weight gain of animals treated with YES Zinc G3 (YES 22) from this invention was significantly higher. This is probably due to increased zinc absorption by the animals in this treatment, and the fact that zinc absorption was being the limiting factor in the animals' performance. Table 12 below refers to Feed Consumption (kg/bird), and Table 13 refers to Weight Gain (kg/bird), wherein: SF=$ZnSO_4$ (35% Zn); Met=Zn Methionate (Avalia 10% Zn); Gly=Zn Glycinate (B-Traxim 26% Zn); Prot=Proteined Zn (Bioplex 16% Zn); YES Zn 16%=YES Zn G2 (16% Zn); and YES Zn 22%=YES Zn G3 (22% Zn).

TABLE 12

| level of zinc | source of zinc | | | | | |
|---|---|---|---|---|---|---|
| | prior art | | | | | present invention |
| (mg/kg) | SF | Met | Gly | Prot | YES 16 | YES 22 |
| 40 | 4.81 | 4.82 | 4.77 | 4.81 | 4.67 | 4.81 |
| 80 | 4.73 | 4.93 | 4.82 | 4.77 | 4.68 | 4.74 |
| mean | 4.77 | 4.88 | 4.79 | 4.79 | 4.67 | 4.77 |

TABLE 13

| level of zinc | source of zinc | | | | | |
|---|---|---|---|---|---|---|
| | prior art | | | | | present invention |
| (mg/kg) | SF | Met | Gly | Prot | YES 16 | YES 22 |
| 40 | 3.17 | 3.13 | 3.16 | 3.20 | 3.16 | 3.22 |
| 80 | 3.14 | 3.25 | 3.18 | 3.16 | 3.17 | 3.24 |
| mean | 3.16 | 3.19 | 3.17 | 3.18 | 3.17 | 3.23 |

Table 14 below is considered the most important in the experiment. It presents the feed conversion results for each of the treatments and shows that only treatments that used chelated zinc in soybean proteins, that is, YES Zn 16% and YES Zn 22%, managed to improve feed conversion. This is due to the fact that they are multi-amino acids, which gives them greater opportunities for absorption in the various sites specialized in absorption of specific amino acids, when compared to mono-amino acids, which only have a chance of being absorbed in absorption sites specialized in the species of amino acid to which they belong. In addition, the performance of YES Zinc G3 (YES 22) from this invention was significantly superior to that of YES Zn 16% from the prior art, which uses chelates on soybean proteins.

Feed conversion is the main productivity indicator in poultry farming and has an important economic and environmental impact. The improvement in feed conversion provided by YES Zn 22% compared to other treatments, respectively from 1.51 to 1.46, means that it was possible to produce 1 kg of live chicken with 1.46 kg of feed, that is, a direct gain in the profit margin of around 3.0% pp. From an environmental point of view, conservatively, this improvement can be understood as the possibility of a 3.4% reduction in zinc consumption, compared to the average of other zinc sources not bound to soybean proteins, and a 1.4% reduction in relation to zinc sources bound to soybean proteins, according to the state of art.

The results of feed conversion shown in Table 14 also allow an extrapolation on the results of supplementation with various sources of zinc, in dosages of 40 and 80 ppm. Such extrapolation indicates that, given the magnitude of the improvement shown by YES 22 from this invention, among supplementations using 40 and 80 ppm of Zn, a supplementation with 100 ppm of Zn should improve feed conversion to 1.45, that is, it turns the improvement in performance of YES 22 even more significant. Table 14 below shows the Feed Conversion (WG, kg consumption/kg), wherein: SF=$ZnSO_4$ (35% Zn); Met=Zn Methionate (Avalia 10% Zn); Gly=Zn Glycinate (B-Traxim 26% Zn); Prot=Proteined Zn (Bioplex 16% Zn); YES Zn 16%=YES Zn G2 (16% Zn); and YES Zn 22%=YES Zn G3 (22% Zn).

TABLE 14

| level | source of zinc | | | | | |
|---|---|---|---|---|---|---|
| of zinc | prior art | | | | | present invention |
| (mg/kg) | SF | Met | Gly | Prot | YES 16 | YES 22 |
| 40 | 1.52 | 1.54 | 1.51 | 1.51 | 1.48 | 1.50 |
| 80 | 1.51 | 1.52 | 1.52 | 1.51 | 1.48 | 1.46 |
| 100(*) | 1.52 | 1.51 | 1.51 | 1.50 | 1.47 | 1.45 |
| mean | 1.51 ab | 1.53 b | 1.51 ab | 1.51 ab | 1.48 a | 1.47 a |

(*)trend based on results from 40 to 80 ppm of Zn

Tables 15 and 16 below show the concentration of zinc in feces and the percentage of zinc that was absorbed by the animals in the treatments, on day 33 of the experiment. From an economic and especially environmental point of view, a low zinc content in the feces and a high percentage of ingested zinc absorption is better. From the results shown in Tables 15 and 16, YES 22 from the invention showed the lowest zinc content in feces and the highest rate of absorption, that is, bio-availability. From an economic point of view, these results indicate that it would be possible to obtain the same performance as the other treatments with a smaller supplementation of YES 22. From an environmental point of view, the results in Tables 15 and 16 show that YES 22 from this invention reduced by 11.4% the concentration of zinc in feces, when compared to zinc glycinate, which was the best alternative for reduction of zinc content in feces, among zinc sources not bound to soybean proteins. Regarding YES 16, which represents the state of art among zinc sources bound to soybean proteins, the reduction of zinc in feces was 8.3%. If it is considered that zinc accounts for more than 60% of the consumption of metallic minerals in nutrition of humans and animals, whose excrements end up polluting rivers and groundwater, this is a very significant reduction. Table 15 below refers to Zinc Excretion (mg/bird) on day 42, and Table 16 refers to Percentage of Retained Zinc, wherein: SF=$ZnSO_4$ (35% Zn); Met=Zn Methionate (Avalia 10% Zn); Gly=Zn Glycinate (B-Traxim 26% Zn); Prot=Proteined Zn (Bioplex 16% Zn); YES Zn 16%=YES Zn G2 (16% Zn); and YES Zn 22%=YES Zn G3 (22% Zn).

TABLE 15

| level | source of zinc | | | | | |
|---|---|---|---|---|---|---|
| of zinc | prior art | | | | | present invention |
| (mg/kg) | SF | Met | Gly | Prot | YES 16 | YES 22 |
| 40 | 10.26 | 8.84 | 8.37 | 9.60 | 8.02 | 9.42 |
| 80 | 9.17 | 10.21 | 9.29 | 9.12 | 8.81 | 8.08 |
| mean | 9.7 | 9.5 | 8.8 | 9.4 | 8.4 | 8.3 |

TABLE 16

| level | source of zinc | | | | | |
|---|---|---|---|---|---|---|
| of zinc | prior art | | | | | present invention |
| (mg/kg) | SF | Met | Gly | Prot | YES 16 | YES 22 |
| 40 | 19.52 | 32.58 | 31.16 | 20.22 | 43.54 | 43.16 |
| 80 | 47.23 | 55.02 | 52.40 | 51.83 | 58.59 | 61.73 |
| mean | 33.4 | 43.8 | 41.8 | 36.0 | 51.1 | 52.4 |

Environmental Impact

By having greater bio-availability, that is, being more absorbed by the body, the chelated minerals from this invention can significantly contribute to reduce the content of metallic minerals contained in feces of humans and farm animals, which pollute the soil and subsequently groundwater and rivers.

The differences in efficiency in feed conversion (Table 14) showed that the products from the invention can provide a lower use of mineral supplementation of approximately 3.4% when compared to various types of chelates from the prior art. Likewise, the differences in absorption rates (Table 16) show that the products from this invention can reduce the content of metallic minerals in human and farm animal feces by 11.4%. The sum of these two benefits would allow to expect, conservatively, that the replacement of consumption minerals from the prior art would reduce by 11,600 ton/year [78,600 ton/year×(3.4%+11.4%)] the emission of metallic pollutants in soil, all over the Planet. It is estimated that currently the consumption of chelated minerals is 78,600 ton/year.

According to the average results shown in Table 16 it is also possible to elaborate two hypotheses for the environmental impact of the products from this invention.

Hypothesis 1 is shown in Table 17, wherein the theoretical and hypothetical replacement of use of all minerals (any mineral bound to organic molecules) by the chelated minerals from this invention is made. The assumptions used for absorption are conservative, as the best absorption rate of chelated minerals from the prior art was used (43.8%) as being representative of all of them. The world consumption of each of the metallic minerals was also estimated. The difference in pollutants emitted shows a potential reduction of approximately 12,040 ton/year (451,640-439,600), if the products from this invention were to replace the minerals from the prior art. Table 17 below refers to Hypothesis 1—Minerals in Nutrition (ton/year).

TABLE 17

| market share | 1-inorganic minerals 80%(**) | 2-organic minerals(*) 20%(**) | 3-minerals from this invention 20%(**) | world total I (1 + 2) 100% | world total II (1 + 3) 100% |
|---|---|---|---|---|---|
| zinc | 392,000 | 98,000 | 98,000 | 490,000 | 490,000 |
| manganese | 84,000 | 21,000 | 21,000 | 105,000 | 105,000 |
| copper | 56,000 | 14,000 | 14,000 | 70,000 | 70,000 |
| selenium | 16,800 | 4,200 | 4,200 | 21,000 | 21,000 |
| chrome | 5,600 | 1,400 | 1,400 | 7,000 | 7,000 |
| cobalt | 5,600 | 1,400 | 1,400 | 7,000 | 7,000 |
| bio-absorption | 33.4% | 43.8% | 52.4% | 35.5% | 37.2% |
| pollutants | 372,960 | 78,680 | 66,640 | 451,640 | 439,600 |

(*) all types of minerals bound to organic molecules, including chelates
(**) estimated share in total consumption Hypothesis 2 is shown in Table 18, wherein the theoretical and hypothetical replacement of 50% of inorganic minerals used in human and animal nutrition by the chelated minerals from this invention is made. As in the previous hypothesis, the calculations are quite conservative, as the absorption rate of Zinc Sulfate Pentahydrate, utilised in the example of use of the product, was attributed as the standard for all inorganic minerals. The results in Table 18 show that the total metals contained in human and animal feces would decrease to something around 398,440 ton/year, against the estimate of 451,640 ton/year currently dumped in soil and rivers of the Planet. This is a significant potential reduction of 53,200 ton/year less pollutants, or a reduction of about 11.7%. Table 18 below refers to Hypothesis 2-Minerals in Nutrition (ton/year).

TABLE 18

| marker share | inorganic minerals 40%(**) | organic minerals(*) 20%(**) | minerals from this invention 40%(**) | world total 100% |
|---|---|---|---|---|
| zinc | 196,000 | 98,000 | 196,000 | 490,000 |
| manganese | 42,000 | 21,000 | 42,000 | 105,000 |
| copper | 28,000 | 14,000 | 28,000 | 70,000 |
| selenium | 8,400 | 4,200 | 8,400 | 21,000 |
| chrome | 2,800 | 1,400 | 2,800 | 7,000 |
| cobalt | 2,800 | 1,400 | 2,800 | 7,000 |

TABLE 18-continued

| marker share | inorganic minerals 40%(**) | organic minerals(*) 20%(**) | minerals from this invention 40%(**) | world total 100% |
|---|---|---|---|---|
| bio-absorption | 33.4% | 43.8% | 52.4% | 43.1% |
| pollutants | 186,480 | 78,680 | 133,280 | 398,440 |

(*) all types of minerals bound to organic molecules, including chelates
(**) estimated share in total consumption Several countries, including the European Union, are already adopting policies to mitigate the emission of metallic pollutants in agricultural soils. In the EU, the amount of excrement from diets supplemented with minerals from inorganic sources that can be distributed in the soil is half the amount of excrement from diets supplemented with chelated minerals.

The invention claimed is:

1. A process for obtaining a concentrate of chelated minerals, wherein said process comprises:

(a) providing a reactor with a raw material containing amino acids or peptides from soybean aminogram diluted in water, in a proportion varying from 1 kilogram of soybean bran to 4 liters of the water up to 1 kilogram of the soybean bran to 7 liters of the water, with temperature between 3° and 50° C. under stirring to obtain a completely homogenized reaction mixture;

(b) microparticulating the homogenized reaction mixture (2,500-5,000 rotations per minute) for a period ranging from 15 minutes to 2 hours, to form an emulsion;

(c) reacting amino acids in the emulsion with metal in an aqueous solution of an alkalizing agent, adding transition metal salt or alkaline earth salt from 1.0:1.2-1.8 of divalent metal ions in relation to the amino acids, respectively, reaction occurring in an alkaline medium by addition of base or alkalizing agent in a molar concentration from 0.001 to 0.20 mole/liter of NaOH to form a reaction mixture;

(d) dosing amylase and cellulase enzymes to the reaction mixture, which are allowed to react for 2 to 4 hours at a temperature of 40 to 60° C. and pH=4.5 to 6.5;

(e) adding proteases to mixture obtained in the step (d), which react at pH=7.8 to 9.4 at a temperature between 5° and 70° C. for another 2 to 4 hours, until observation of reaction by analysis of degree of hydrolysis; and (f) subjecting product obtained to drying.

2. A process for obtaining a concentrate of chelated minerals, wherein said process comprises:

(a) preparing a suspension of soybean in water, at 30° C. to 50° C., comprising 1 kg of the soybean bran to 4 liters of the water up to 1 kg of the soybean bran to 7 liters of the water;

(b) homogenizing the suspension from 2,500 to 5,000 rotations per minute for a period ranging from 15 minutes to 2 hours;

(c) adding amylase and cellulase to homogenized suspension, which react for 2 to 4 hours at a temperature of 40 to 60° C. and pH=4.5 to 6.5 to form an enzyme mixture;

(d) conducting protein hydrolysis by reacting proteases with the enzyme mixture for a minimum period of 2 to 5 hours at pH=7.8 to 9.4 at a temperature between 4° and 60° C. to obtain a reaction mixture;

(e) heating the reaction mixture at a temperature between 5° and 70° C. for a further 2 to 4 hours;

(f) chelating minerals with the reaction mixture under slow stirring ranging from 120 to 250 rpm, with a temperature between 4° and 60° C., and pH maintained at levels above 7.0, salt containing mineral to be chelated is added to the reaction mixture directly in its solid state or solubilized in water, using a molar or stoichiometric ratio of 1.0:1.2-1.8 in moles of divalent metal ions to moles of amino acids, respectively, for at least 1 hour, before obtained chelated mineral is dried.

3. The process of claim 2, wherein after causing the protein hydrolysis to occur, the process subjects protein base to protein precipitation and removal of impurities.

4. The process of claim 2, further comprising deriving amino acids and peptides from the soybean protein hydrolyzate, which soybean protein hydrolyzate is the soybean bran containing between 42 and 70% of proteins.

5. The process of claim 2, wherein metal salt may be from divalent or trivalent metals selected from cobalt, copper, iron, manganese, zinc or chromium, or alkaline earth metals such as calcium or magnesium.

6. The process of claim 2, wherein soybean aminogram comprises the following molar fractions of each amino acid:

0.07Asp+0.05Asn+0.12Glu+0.05Gln+0.07Ser+0.08Gly+0.02His+0.06Thr+0.07Ala+0.06Pro+0.03Tyr+0.06Val+0.01Met+0.01Cys+0.05Ile+0.08Leu+0.04Phe+0.06Lys+0.01Trp wherein amino acids from the soybean aminogram can be added.

* * * * *